(12) United States Patent
Akagi et al.

(10) Patent No.: US 8,340,926 B2
(45) Date of Patent: Dec. 25, 2012

(54) INTERNAL COMBUSTION ENGINE CONTROL APPARATUS

(75) Inventors: Yoshihiko Akagi, Hitachinaka (JP); Takuto Okamoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 295 days.

(21) Appl. No.: 12/813,111

(22) Filed: Jun. 10, 2010

(65) Prior Publication Data
US 2011/0004422 A1      Jan. 6, 2011

(30) Foreign Application Priority Data
Jul. 1, 2009  (JP) .................................. 2009-157080

(51) Int. Cl.
*G06F 19/00*     (2011.01)
(52) U.S. Cl. ......................................... 702/46
(58) Field of Classification Search .................... 702/46
See application file for complete search history.

(56) References Cited

U.S. PATENT DOCUMENTS

| | | | |
|---|---|---|---|
| 4,718,016 A * | 1/1988 | Sudo | 701/110 |
| 5,931,138 A * | 8/1999 | Uchida | 123/436 |
| 2004/0244479 A1* | 12/2004 | Matsumoto et al. | 73/204.26 |

FOREIGN PATENT DOCUMENTS

| | | |
|---|---|---|
| JP | 2002-295292 A | 10/2002 |
| JP | 2003-287453 A | 10/2003 |

* cited by examiner

*Primary Examiner* — Tung S Lau
(74) *Attorney, Agent, or Firm* — Crowell & Moring LLP

(57) ABSTRACT

An internal combustion engine control apparatus according to the present invention includes storage for storing a plurality of air flow rate conversion tables T1 and T2 used to convert a signal of a heating resistor 2 to an air flow rate, a selector for selecting a conversion table to be referred to from the plurality of conversion tables T1 and T2 stored, and a converter for converting a signal of the heating resistor into an air flow rate by referring to the conversion table selected by the selector. The selector performs selection of the conversion table according to a state value, which directly or indirectly indicates the state of air flow pulsation generated in a passage.

3 Claims, 12 Drawing Sheets

INTERNAL COMBUSTION ENGINE CONTROL APPARATUS

BACKGROUND OF THE INVENTION

1. Field of the Invention

The present invention relates to an internal combustion engine control apparatus having a thermal air flow rate measuring apparatus, and relates to an internal combustion engine control apparatus having a thermal air flow rate measuring apparatus which detects the flow rate of air flowing through an intake passage on the basis of, for example, a signal from a heating resistor.

2. Background Art

Conventionally, in an internal combustion engine control apparatus for an automobile or the like, an air flow rate measuring apparatus is arranged at an intake pipe of the internal combustion engine in order to detect the intake air flow rate of the internal combustion engine, and the fuel injection amount is controlled by using the air flow rate measured by the air flow rate measuring apparatus. Also, in recent years, it has been an important problem to improve the exhaust performance of the internal combustion engine, and it has become common to convert outputs of various sensors into digital values, on the basis of which the fuel injection amount is controlled by means of a digital arithmetic unit.

In the internal combustion engine, the air column phenomenon referred to as pulsation is generated by the resonance of an air pressure vibration caused by vertical movement of a piston, and a natural frequency vibration of the intake pipe. When the opening of a throttle valve installed in the intake pipe is increased, the amplitude of pulsation is increased.

Usually, air flows into a cylinder from an air cleaner. However, there is a case where air flows from the intake valve of the internal combustion engine to the air cleaner, and this phenomenon is referred to as reverse flow. When the reverse flow is measured by an air flow rate measuring apparatus which is not provided with the function to detect the reverse flow, the flow rate is measured as the forward flow rate regardless of the flow direction, and hence an error is caused in the air flow rate.

In order to solve this problem, an air flow rate measuring apparatus having a reverse flow detecting function is also available. Generally, many of the air flow rate measuring apparatuses having the reverse flow detecting function are a thermal type, and have characteristics in which the output level on the forward flow side is high and in which the output level on the reverse flow side is low.

It is known that in the thermal air flow rate measuring apparatus, an error is caused, at the time of pulsation, between the average flow rate of air actually taken into the cylinder and the average value of the air flow rate calculated by the digital arithmetic unit, due to the influence of a response delay caused by the heat capacity of the thermal air flow rate measuring apparatus itself, and due to the influence of a non-linear correspondence relationship between the air flow rate and the output of the thermal air flow rate measuring apparatus.

Further, it is known that as the fluid behavior at the time when the air flowing through the intake pipe is made to reversely flow, a phase shift is caused between the flow near the pipe wall surface and the main flow. In many cases, the element section of the thermal air flow rate detecting apparatus capable of detecting the reverse flow has a planar shape, and hence generates an error because, at the element section, a similar fluid behavior is caused between the main flow and the flow near the wall surface.

As a method to reduce the error due to the influence of the non-linear correspondence relationship among the above described influences, there is proposed in JP Patent Publication (Kokai) No. 2002-295292A a technique in which the air flow rate region that includes the reverse flow region and that is equal to or lower than a minimum air flow rate q0 is corrected on the basis of an air flow rate conversion table for converting an output signal of the air flow rate measuring apparatus into an air flow rate.

SUMMARY OF THE INVENTION

However, even in the case where the air flow is the forward flow and where the air flow rate is higher than the minimum air flow rate q0, when the pulsation is generated in the passage, a measurement error of the air flow rate may be caused in the thermal air flow rate measuring apparatus so that an accurate air flow rate cannot be obtained.

The present invention has been made in view of the above described circumstances. An object of the present invention is to provide an internal combustion engine control apparatus which is capable of obtaining an accurate air flow rate by using a thermal air flow rate measuring apparatus at the time when the pulsation is caused.

To this end, an internal combustion engine control apparatus according to the present invention, provided with a thermal air flow rate measuring apparatus by which the flow rate of air flowing through a passage is detected on the basis of a signal of a heating resistor, is featured by including: storage means for storing a plurality of air flow rate conversion tables used to convert a signal of the heating resistor to an air flow rate; selection means for selecting a conversion table to be referred to from the plurality of conversion tables stored in the storage means; and conversion means for converting a signal of the heating resistor into an air flow rate by referring to the conversion table selected by the selection means, and is featured in that the selection means selects the conversion table according to a state value which directly or indirectly indicates the state of air flow pulsation generated in the passage.

According to the present invention, a conversion table is selected according to the state value of air flow pulsation generated in the passage, and a signal of the heating resistor is converted into an air flow rate by referring to the conversion table. Thus, it is possible to correct the measurement error of air flow rate, which is caused in the thermal air flow rate measuring apparatus at the time of occurrence of pulsation. Therefore, for example, in the case where the air flow is a forward flow, and where the air flow rate is higher than the minimum air flow rate, even when the pulsation is caused, the measurement error of the air flow rate can be corrected, and hence the air flow rate can be highly accurately measured. Therefore, it is possible to improve the accuracy of air-fuel ratio in the high load region.

DESCRIPTION OF SYMBOLS

Figure 1:
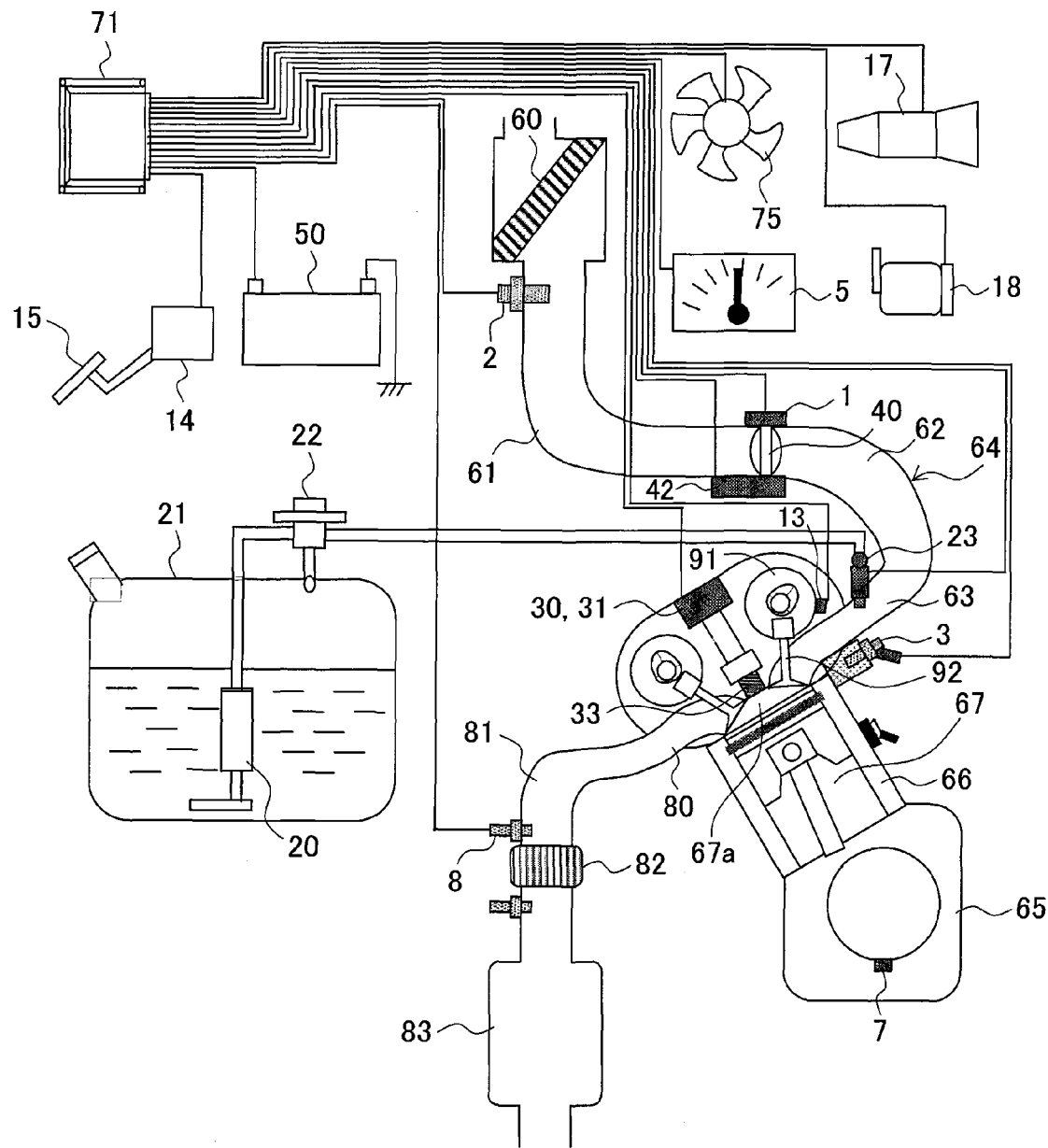
FIG. 1 is a schematic view of an internal combustion engine control apparatus according to the present embodiment.

1 Throttle sensor
2 Thermal air flow rate detecting apparatus
3 Water temperature sensor
7 Crank angle sensor
8 Air-fuel ratio sensor
13 Cam angle sensor
14 Accelerator sensor
20 Fuel pump
21 Fuel tank
22 Pressure regulator
23 Injector
30 Ignitor
31 Ignition coil
33 Spark plug
40 Throttle valve
42 Throttle actuator
60 Air cleaner
61 Intake duct
62 Collector
63 Intake pipe
65 Internal combustion engine
81 Engine control unit (control apparatus)
81 Exhaust pipe
91 Valve timing variable mechanism (variable valve mechanism)
92 Intake valve

DETAILED DESCRIPTION OF THE PREFERRED EMBODIMENTS

In the following, embodiments according to the present invention will be described with reference to the accompanying drawings.

Figure 2:
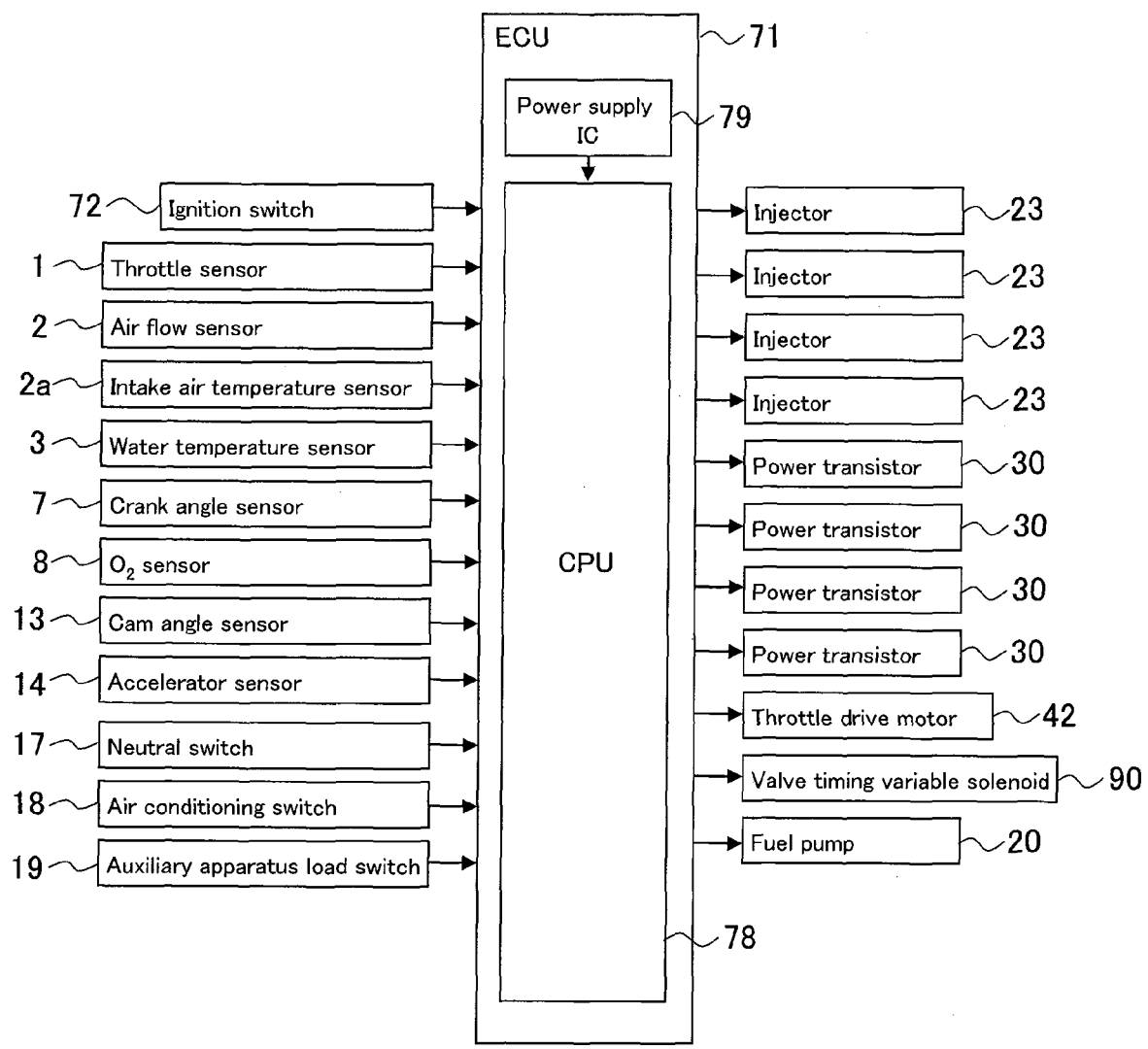
FIG. 2 is a block diagram for describing inputs and outputs of an engine control unit.

FIG. 1 is a view showing an internal combustion engine control apparatus according to the present invention. FIG. 2 is a view for describing inputs and outputs of an engine control unit.

An internal combustion engine 65 is a so-called in-line four-cylinder internal combustion engine of an MPI (Multi-Point Injection) system, in which air to be taken into the internal combustion engine 65 is made to pass through an air cleaner 60 and to flow into a combustion chamber 67a of each cylinder 67 through an intake passage 64 configured by an intake duct 61, a collector 62, and an intake pipe 63.

An intake valve 92 for opening and closing communication between the intake passage 64 and the combustion chamber 67a is arranged at an intake port which communicates with a downstream portion of the intake passage 64. The intake air flow rate is detected by an air flow sensor (thermal air flow rate measuring apparatus) 2 arranged downstream from the air cleaner 60.

The air flow sensor 2 has a heating resistor (not shown), and is configured such that a signal corresponding to an intake air flow rate is outputted from the heating resistor, and that an intake air temperature signal measured by an intake air temperature sensor 2a using a thermistor is outputted. The hot-wire type air flow sensor 2 has high responsiveness, and highly accurately responds to pulsation generated in the intake passage 64, so as to output an output signal of pulsation waveform.

Figure 11:
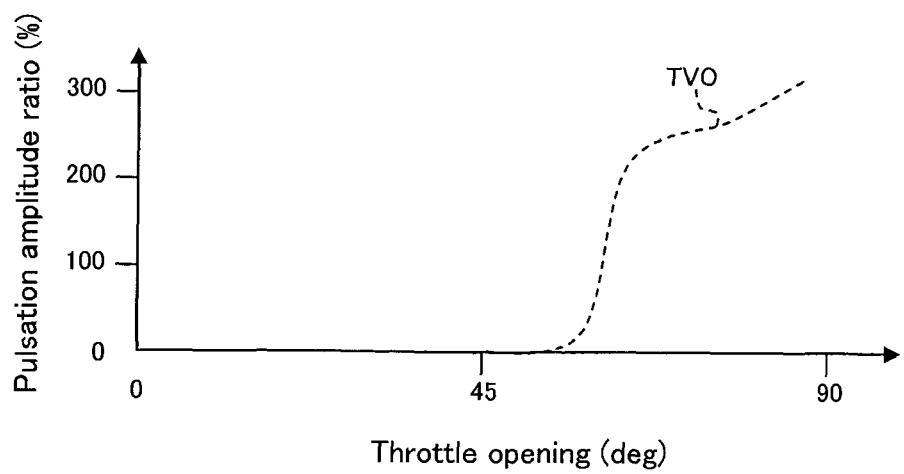
FIG. 11 is a view for describing a relationship between the throttle opening and the pulsation amplitude ratio.

An electronic control throttle valve 40, which is provided in the middle of the intake passage 64, is capable of reducing the opening area of the intake passage 64 by being moved in the closing direction, and has an effect to prevent pulsation from easily occurring in the intake passage 64 (see FIG. 11). The electronic control throttle valve 40 is driven by a throttle drive motor 42 on the basis of a signal from an engine control unit 71.

A throttle opening sensor 1 which detects the opening is attached to the electronic control throttle valve 40. The signal of the throttle opening sensor 1 is inputted into the control unit 71, so as to be used to perform feedback control of the throttle opening TVO of the throttle valve 40, detection of the fully closed position, detection of acceleration, and the like. Note that the target opening of the feedback control can be obtained from the amount of accelerator depression by the driver, which amount is detected by an accelerator opening sensor 14, and can be obtained from an idling rotational speed control amount, that is, an ISC control amount.

The internal combustion engine 65 includes a valve timing variable mechanism 91 as a variable valve mechanism. The valve timing variable mechanism 91, which is driven on the basis of a drive signal from the engine control unit 71, has a configuration capable of adjusting the opening and closing timing as the valve timing, and performs feedback control for a target cam angle. When the valve timing of the intake valve 92 is changed by the valve timing variable mechanisms 91, blow back from the combustion chamber 67a to the intake pipe 63 may be caused.

Figure 13:
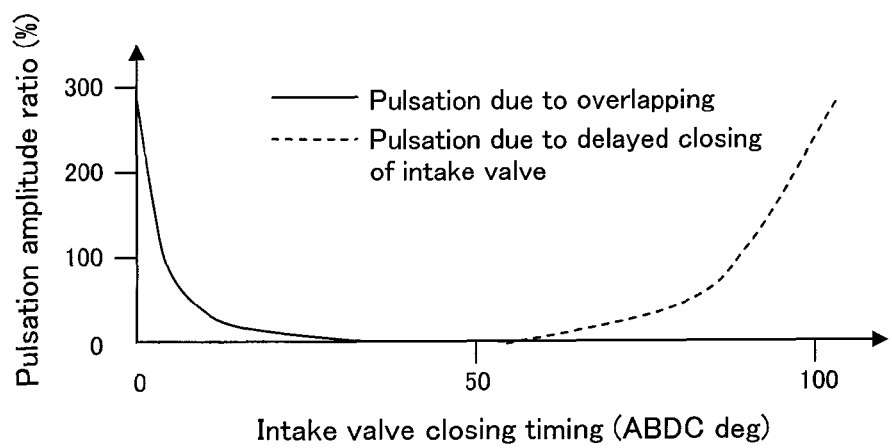
FIG. 13 is a view for describing a relationship between the intake valve closing timing and the pulsation amplitude ratio.

The blow back is caused when the closing timing of the intake valve 92 is early or late (for example, see FIG. 13). This is based on the fact that, when the valve closing timing is early, the intake valve 92 is opened before the completion of the exhaust process, so as to cause blow back from the inside of the combustion chamber 67a to the intake passage 64. This is also based on the fact that, when the valve closing timing is late, the air in the combustion chamber 67a during a compression stroke is blown back to the intake passage 64 due to the late closing of the intake valve 92. As a result, the blow back is periodically caused, and hence the amount of pulsation is changed according to the closing timing of the intake valve (see FIG. 13).

A pulse is outputted at every predetermined crank angle from a crank angle sensor 7 attached to the crank case of the internal combustion engine 65, so as to be inputted into the engine control unit 71. The accelerator opening sensor 14 detects the depression amount of an accelerator pedal 15, and thereby detects the torque required by the driver. Fuel from a fuel tank 21 is sucked and pressurized by a fuel pump 20, and is regulated to a constant pressure by a pressure regulator 22, so as to be injected into the intake pipe 63 from an injector 23.

A water temperature sensor 3 for detecting the cooling water temperature is attached to a cylinder block 66. A signal of the water temperature sensor 3 is inputted into the control unit 71, so as to be used for detecting the warm-up state of the internal combustion engine 65, for increasing the fuel injection amount, for correcting the ignition timing, for turning on/off a radiator fan 75, and for setting the target rotational speed during idling. Further, an air conditioning switch 18 which monitors the state of an air conditioning clutch, and a neutral switch 17 which is incorporated in a transmission so as to monitor the state of the driving system, are attached in order to calculate the target rotational speed during idling and to calculate the load correction amount.

An air-fuel ratio sensor 8 is mounted to an exhaust pipe 81 which is connected in communication with an exhaust port 80 of the internal combustion engine 65, and outputs a signal corresponding to the oxygen concentration of the exhaust gas. The signal from the air-fuel ratio sensor 8 is inputted into the control unit 71 as a control apparatus, in which adjustment of the fuel injection pulse width, and the like, is performed so as to make the air-fuel ratio become a target air-fuel ratio that is obtained according to an operation state.

The engine control unit 71 is configured by a CPU 78 and a power supply IC 79, as shown in FIG. 2. Here, the signals inputted into the engine control unit 71 are arranged as shown in FIG. 2 so that the signals from the air flow sensor 2, the intake air temperature sensor 2a incorporated in the air flow sensor 2, the crank angle sensor 7, the throttle opening sensor 1, the air-fuel ratio sensor 8, the water temperature sensor 3, and the like, are inputted to the engine control unit 71.

The engine control unit 71 reads a voltage of the air flow sensor 2 at every fixed period. Since the engine control unit 71 reads the voltage at every 10 ms in the present embodiment, it is necessary to take aliasing into consideration at the time of occurrence of pulsation. Further, the pulsation frequency of air flow rate is proportional to the engine rotational speed. The output signals from the engine control unit 71 are outputted to the injector 23, the fuel pump 20, and power transistors 30 having ignition switches of spark plugs 33, and the like.

The engine control unit 71 has storage means which stores a plurality of conversion tables for converting a signal from the air flow sensor 2 into an air flow rate. Further, by executing an air flow rate measuring program, it is possible to realize selection means by which a conversion table used for the conversion is selected from the plurality of conversion tables stored in the storage means, and conversion means by which a signal from the air flow sensor 2 is converted into an air flow rate by using the conversion table selected by the selection means.

In the above described internal combustion engine 65, the pulsation is caused by the resonance of an air pressure vibration generated at a period of vertical movement of a piston and a natural frequency vibration of the intake passage 64. Further, in the high compression ratio cycle engine having late opening/closing timing of the intake valve 92, the reverse flow is generated to thereby cause larger pulsation. Further, also when the opening timing of the intake valve 92 is early, and when the overlapping of the intake valve 92 is large, the reverse flow is generated by the exhaust pressure, and the like, to thereby cause larger pulsation.

Next, the air flow rate conversion method according to embodiment 1 will be described below with reference to FIG. 3 to FIG. 8.

Figure 3:
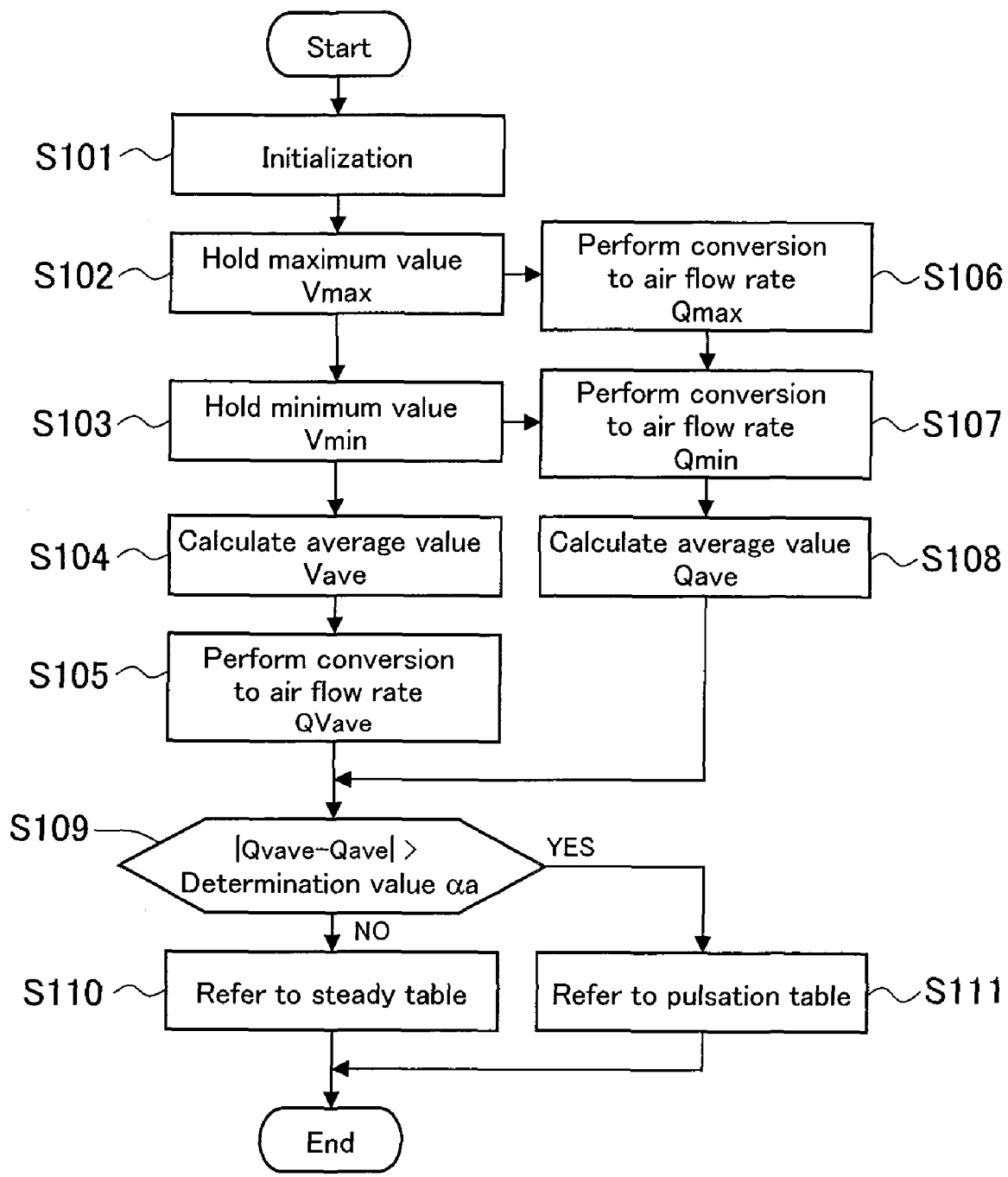
FIG. 3 is a flow chart for describing an air flow rate conversion method according to embodiment 1.

FIG. 3 is a flow chart for describing an air flow rate conversion method according to embodiment 1.

First, in step S101, initialization processing is performed, and the information stored in the memory of the engine control unit 71 is cleared. Then, in step S102 and S103, a maximum value Vmax and a minimum value Vmin of a signal from the air flow sensor 2 are detected and held. In step S104, an average value Vave is calculated from the maximum value Vmax and the minimum value Vmin. Then, in step S105, an average air flow rate conversion value QVave is calculated by converting the average value Vave into an air flow rate.

Further, in step S106, a maximum air flow rate conversion value Qmax is calculated by converting the maximum value Vmax held in step S102 into an air flow rate. In step S107, a minimum air flow rate conversion value Qmin is calculated by converting the minimum value Vmin held in step S103 into an air flow rate. Then, in step S108, an average air flow rate calculation value Qave, which is an average value of the maximum air flow rate conversion value Qmax and the minimum air flow rate conversion value Qmin, is calculated from the maximum and minimum air flow rate conversion values.

In step S109, it is determined whether or not the absolute value of the difference between the average air flow rate conversion value QVave calculated in step S105 and the average air flow rate calculation value Qave calculated in step S108 is larger than a predetermined determination value $\alpha a$.

Then, when the absolute value of the difference is larger than the determination value $\alpha a$ (YES in step S109), then in step S111, processing for converting a signal from the air flow sensor 2 into an air flow rate is performed by referring to a pulsation table T2.

On the other hand, when the absolute value of the difference is equal to or less than the determination value $\alpha a$ (NO in step S109), then in step S110, processing for converting a signal from the air flow sensor 2 into an air flow rate is performed by referring to a steady table T1.

Figure 4:
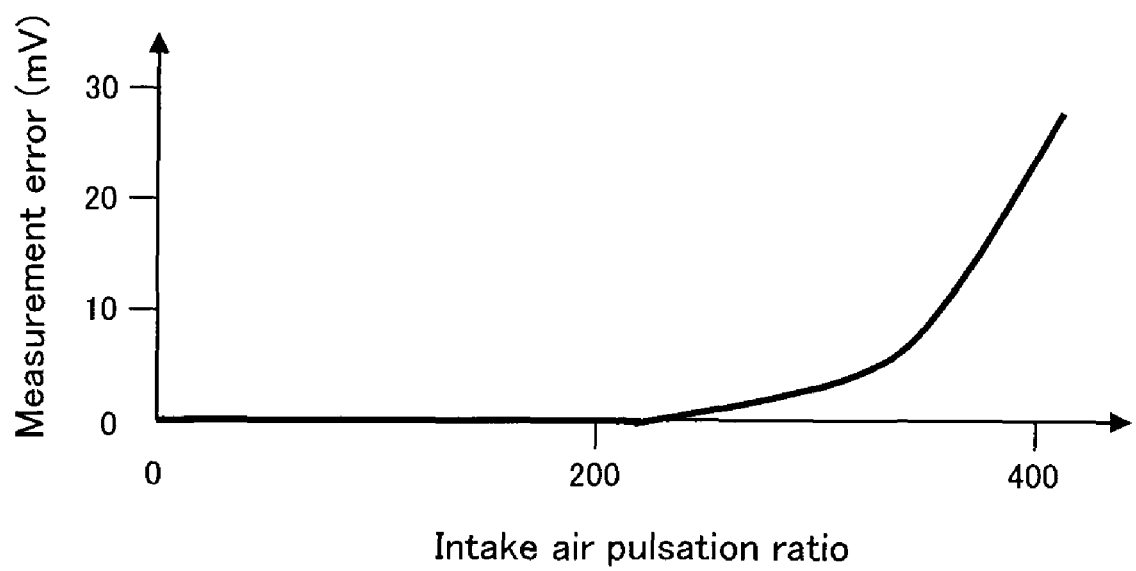
FIG. 4 is a view showing a relationship between the intake air pulsation ratio and the measurement error.

FIG. 4 is a view which represents how the measurement error is changed according to the intake air pulsation ratio and which schematically represents a relationship between the intake air pulsation ratio and the measurement error. In the figure, the intake air pulsation ratio of the abscissa is expressed by (intake air flow rate maximum value−intake air flow rate minimum value)/average value×100. It can be seen from the figure that in the region where the intake air pulsation ratio exceeds 200%, the reverse flow is generated in the intake passage 64. In the example shown in this figure, the measurement error (mV) is increased as the intake air pulsation ratio is increased.

Figure 5:
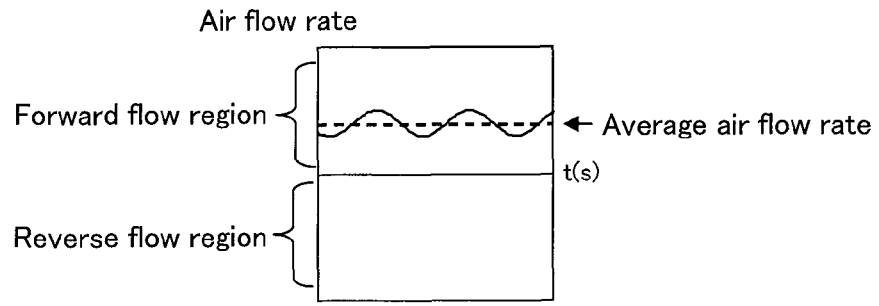
FIG. 5 is a view showing a behavior of intake air in an intake pipe in the case where a small pulsation phenomenon is caused.

FIG. 5 is a view showing a behavior of intake air in the intake passage in the case where a phenomenon of small pulsation is caused. The air flow rate is varied upward and downward from the average flow rate in the forward flow region. This variation is caused by the intermittent intake air pulsation due to the opening and closing of the intake valve 92 of the internal combustion engine 65. Further, the small pulsation is generated when the throttle opening TVO of the throttle valve 40 is small. The pulsation error of the air flow sensor 2 is not caused by this level of pulsation.

Figure 6:
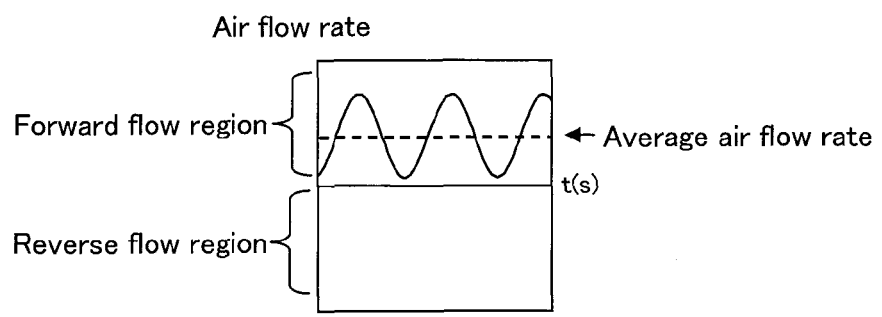
FIG. 6 is a view showing a behavior of intake air in the intake pipe in the case where a medium pulsation phenomenon is caused.

FIG. 6 is a view showing a behavior of intake air in the intake passage in the case where a phenomenon of medium pulsation is caused. At the timing of the minimum flow rate of the pulsation waveform, the flow rate may usually reach a flow rate region lower than the flow rate during the no-load idling period when the intake air amount becomes the minimum intake air amount q0 of the internal combustion engine 65. Such medium pulsation is caused in a region where the throttle opening of the throttle valve 40 is medium. A comparatively small error may be caused as the pulsation error of the air flow sensor 2.

Figure 7:
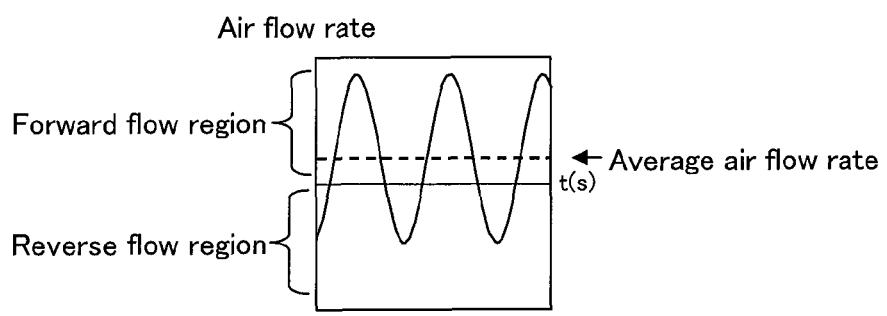
FIG. 7 is a view showing a behavior of intake air in the intake pipe in the case where a large pulsation phenomenon is caused.

FIG. 7 is a view showing a behavior of intake air in the intake passage in the case where a phenomenon of large pulsation is caused. The minimum air flow rate of the pulsation waveform reaches the reverse flow region. Such large pulsation is caused in a region where the throttle opening TVO of the throttle valve 40 is large.

A large error is caused as the pulsation error of the air flow sensor 2. Note that the pulsation error means a phenomenon in which an error between the average flow rate of the air actually taken into the cylinder at the time of pulsation, and the average value of the air flow rate calculated by the digital arithmetic unit is caused by the influence of the response delay due to the heat capacity of the air flow sensor 2 itself, and the influence of the non-linear relationship between the air flow rate and the output of the air flow sensor 2.

Figure 8:
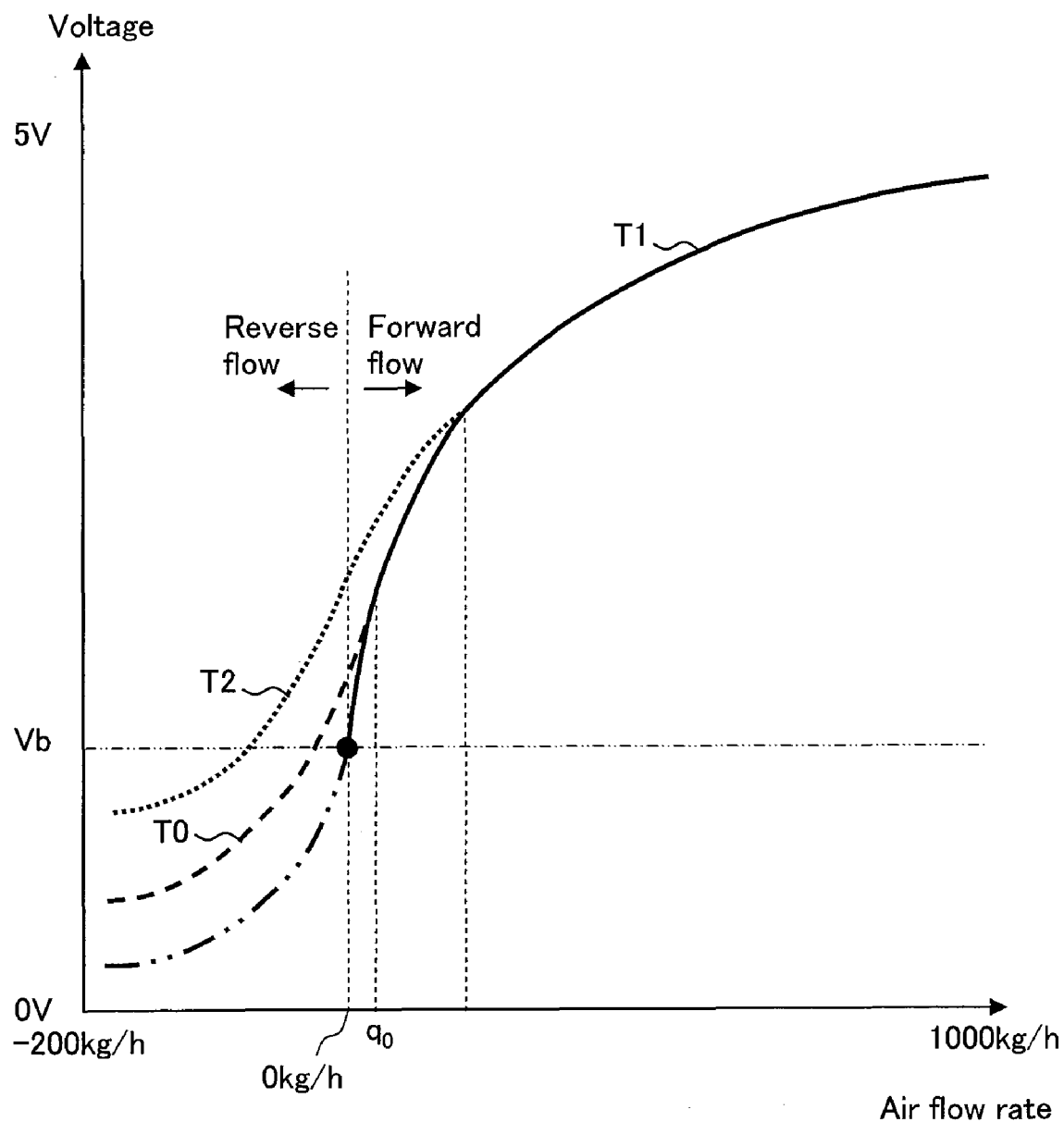
FIG. 8 is a view for describing the setting of air flow rate conversion tables according to the present embodiment.

FIG. 8 is a view for describing the setting of air flow rate conversion tables. The steady table T1 is obtained by plotting steady state characteristics of the air flow sensor 2, and the values of the steady table T1 are set as the values of a common air flow rate conversion table. The values of the steady table T1 is used, as shown by a solid line in FIG. 8, to perform conversion of a signal voltage of the air flow sensor 2 into an air flow rate in the case where the signal voltage of the air flow sensor 2 is equal to or higher than a reference voltage Vb corresponding to the air flow rate of 0 kg/h, and is not used for the conversion in the case where the signal voltage of the air flow sensor 2 is lower than the reference voltage Vb. That is, it is set such that the values of the steady table T1 is used only for the conversion in the forward flow region, and is not used for the conversion in the reverse flow region.

A table T0 represented by a broken line in FIG. 8 is a correction table shown in JP Patent Publication (Kokai) No. 2002-295292A, in which specific pulsation correction is applied in the region of the minimum air flow rate q0 where the no-load idling speed can be maintained, or less. The correction upper limit value is set to the minimum air flow rate q0 because, under a normal operating condition, the intake air amount of the internal combustion engine 65 is not reduced to an amount equal to or less than the air amount at which the no-load idling speed can be maintained.

However, even in the case where the air flow is the forward flow, and where the air flow rate is higher than the minimum air flow rate q0, when large pulsation is generated in the intake passage 64, an air flow rate measurement error may be caused so as to make it impossible to obtain an accurate air flow rate.

Thus, as represented by a dotted line in FIG. 8, the pulsation table T2 according to the present embodiment 1 is set such that the pulsation characteristic correction is applied to the region from the reverse flow region to the forward flow region where the air flow rate is equal to or higher than the minimum air flow rate q0. Thereby, also in the air flow rate used in the normal operating condition, the correction can be set in consideration of pulsation. Thus, the measurement error of the air flow sensor 2 at the time of pulsation can be reduced by using the pulsation table T2.

Therefore, the table setting specialized for the pulsation performance can be performed by switching the conversion tables in such a manner that the steady table T1 is used in the low and medium load operation region where the pulsation is comparatively small, and that the pulsation table T2 is used in the high load operation region where the pulsation is comparatively large. Thereby, the accuracy of the air flow rate measurement using the air flow sensor 2 can be improved.

In the conversion table, the settable upper limit value of the number of plots (for example, 16 plots) is set beforehand, and the plots are set so that they are arranged at a predetermined interval to cover a predetermined voltage range. The steady table T1 is set to cover a predetermined voltage range equal to or higher than the reference voltage Vb, so that the conversion is performed only in the forward flow region where the air flow rate is 0 kg/h or higher. Thus, the setting region of the conversion table can be reduced and the set interval between successive plots can be reduced as compared with the case where, as represented by a two-dot chain line in the figure, the setting region is set to reach a reverse flow region corresponding to a voltage lower than the reference voltage Vb. Therefore, more precise conversion can be performed, so that the measurement accuracy of the air flow rate can be further improved. Note that the configuration of the steady table T1 is not limited to the above described example, and the setting region may be set, as before, to reach a reverse flow region corresponding to a voltage lower than the reference voltage Vb.

In the above described internal combustion engine 65 control apparatus, one of the steady table T1 and the pulsation table T2 is selected according to the amplitude magnitude of air flow pulsation generated in the intake passage 64, and a signal of the air flow sensor 2 is converted into an air flow rate by referring to the selected table. Therefore, it is possible to obtain an accurate air flow rate in which the air flow rate measurement error caused by the air flow sensor 2 at the time of occurrence of pulsation is corrected.

Therefore, in the case where the air flow is the forward flow and where the air flow rate is higher than the minimum air flow rate, even when the pulsation is caused, the air flow rate measurement error, which is caused by the air flow sensor 2, can be corrected, and the air flow rate can be highly precisely measured. Thus, it is possible to improve, for example, the accuracy of the air-fuel ratio in the high load region.

Embodiment 2

In the present embodiment, a case will be described where the average air flow rate Qave and the minimum air flow rate Qmin are used as state values which directly or indirectly indicate the state of pulsation, and where the selection of the conversion table is performed according to these air flow rates.

Figure 9:
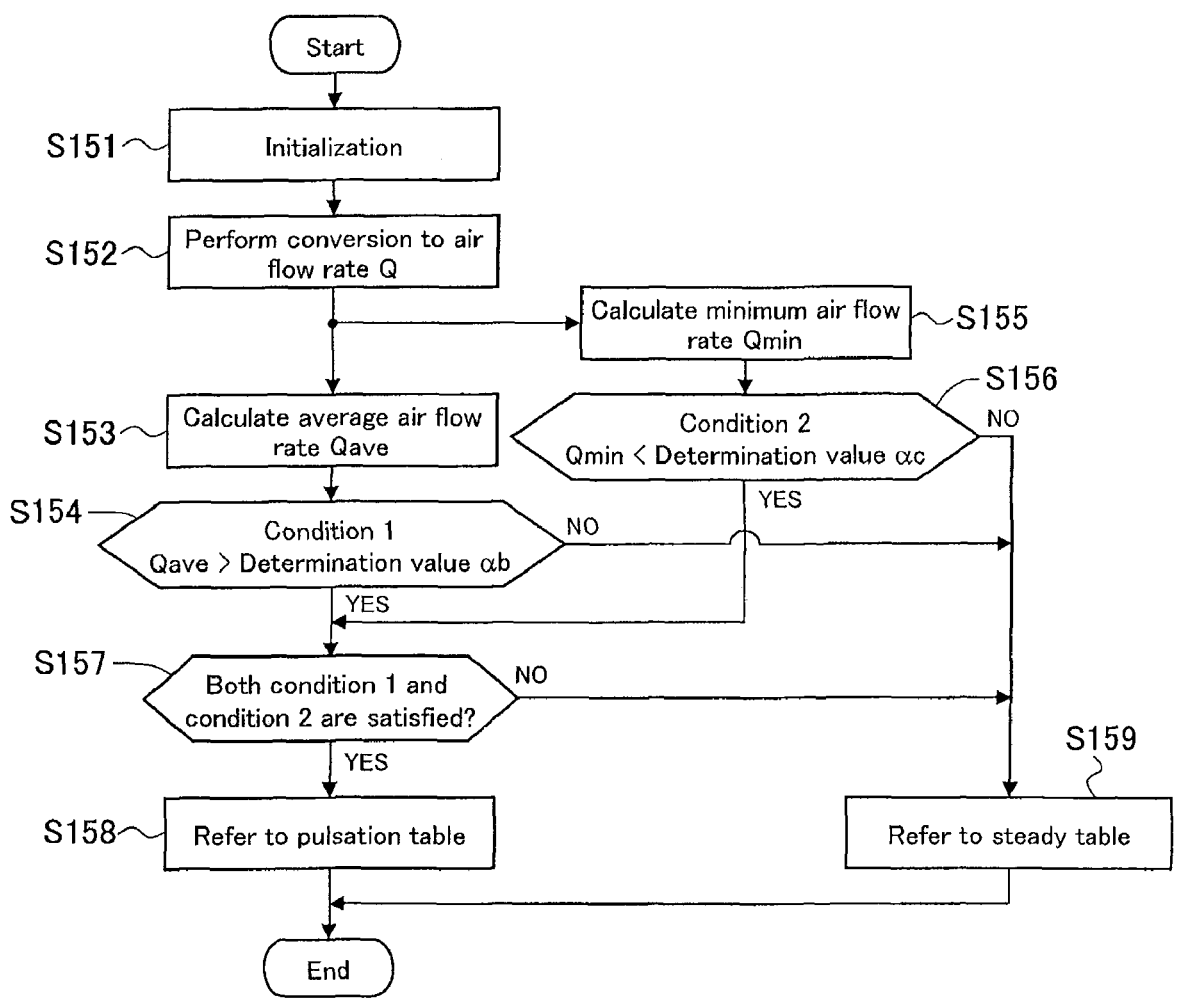
FIG. 9 is a flow chart for describing an air flow rate conversion method according to embodiment 2.

FIG. 9 is a flow chart for describing an air flow rate conversion method according to embodiment 2.

First, in step S151, initialization processing is performed. In step 152, a signal from the air flow sensor 2 is converted into an air flow rate Q. Then, in step S153, the average air flow rate Qave is calculated. In step S154, it is determined whether or not the average air flow rate Qave is higher than a predetermined determination value $\alpha b$ (first determination value) (condition 1).

Further, in step S155, the minimum air flow rate Qmin is calculated on the basis of the air flow rate Q obtained in step S152. In step S156, it is determined whether or not the minimum air flow rate Qmin is lower than a predetermined determination value αc (second determination value) (condition 2).

Then, in step S157, it is determined whether or not both the condition 1 and the condition 2 are satisfied. Here, when both the condition 1 and the condition 2 are satisfied (YES in step S157), that is, when the air flow rate Qave is higher than the determination value αb and lower than the minimum air flow rate Qmin, it is determined that large pulsation causing an error in the air flow rate measurement is generated, and then in step S158, processing to convert a signal from the air flow sensor 2 into an air flow rate is performed by referring to the pulsation table T2.

When at least one of the condition 1 and the condition 2 is not satisfied (NO in step S157), it is determined that large pulsation causing an error in the air flow rate measurement is not generated, and then in step S159, processing to convert a signal from the air flow sensor 2 into an air flow rate is performed by referring to the steady table T1.

Therefore, it is possible to obtain an accurate air flow rate in which the air flow rate measurement error caused by the air flow sensor 2 at the time of occurrence of pulsation is corrected.

Embodiment 3

Figure 10:
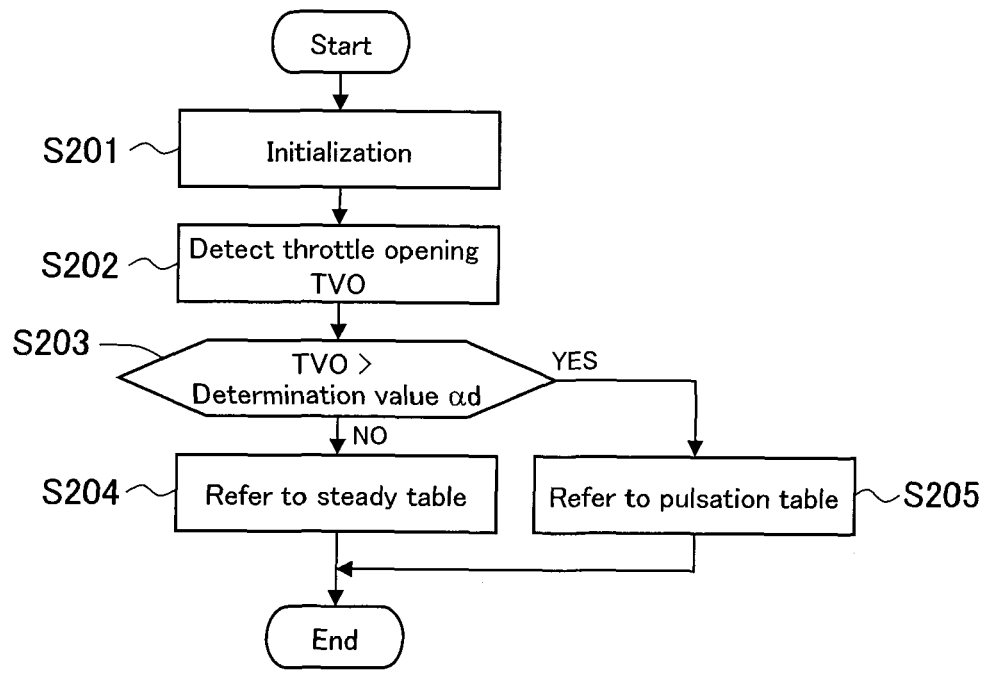
FIG. 10 is a flow chart for describing an air flow rate conversion method according to embodiment 3.

In the present embodiment, a case will be described where the throttle opening TVO of the throttle valve 40 is used as a state value which directly or indirectly indicates the state of pulsation, and where the selection of the conversion table is performed according to the throttle opening TVO. FIG. 10 is a flow chart for describing an air flow rate conversion method according to embodiment 3. FIG. 11 is a view for describing a relationship between the throttle opening and the pulsation.

As shown in FIG. 11, pulsation tends to be increased as the throttle valve 40 is opened by increasing the throttle opening TVO. Therefore, it is possible to recognize the state of pulsation according to the throttle opening TVO.

First, in step S201, initialization processing is performed. In step S202, the throttle opening TVO of the throttle valve 40 is detected. Then, in step S203, it is determined whether or not the throttle opening TVO is larger than a predetermined determination value αd (throttle opening determination value).

When it is determined that the throttle opening TVO is larger than the determination value αd (YES in step S203), it is determined that large pulsation causing an error in the air flow rate measurement is generated, and then in step S205, processing to convert a signal from the air flow sensor 2 into an air flow rate is performed by referring to the pulsation table T2.

Further, when it is determined that the throttle opening TVO is equal to or smaller than the determination value αd (NO in step S203), it is determined that large pulsation causing an error in the air flow rate measurement is not generated, and then in step S204, processing to convert a signal from the air flow sensor 2 into an air flow rate is performed by referring to the steady table T1. Note that the determination value αd may be set according to the engine rotational speed.

Therefore, it is possible to obtain an accurate air flow rate in which the air flow rate measurement error caused by the air flow sensor 2 at the time of occurrence of pulsation is corrected.

Embodiment 4

In the present embodiment, a case will be described where a target cam angle as a control amount of the valve timing variable mechanism 91 is used as a state value which directly or indirectly indicates the state of pulsation, and where the selection of the conversion table is performed according to the target cam angle.

Figure 12:
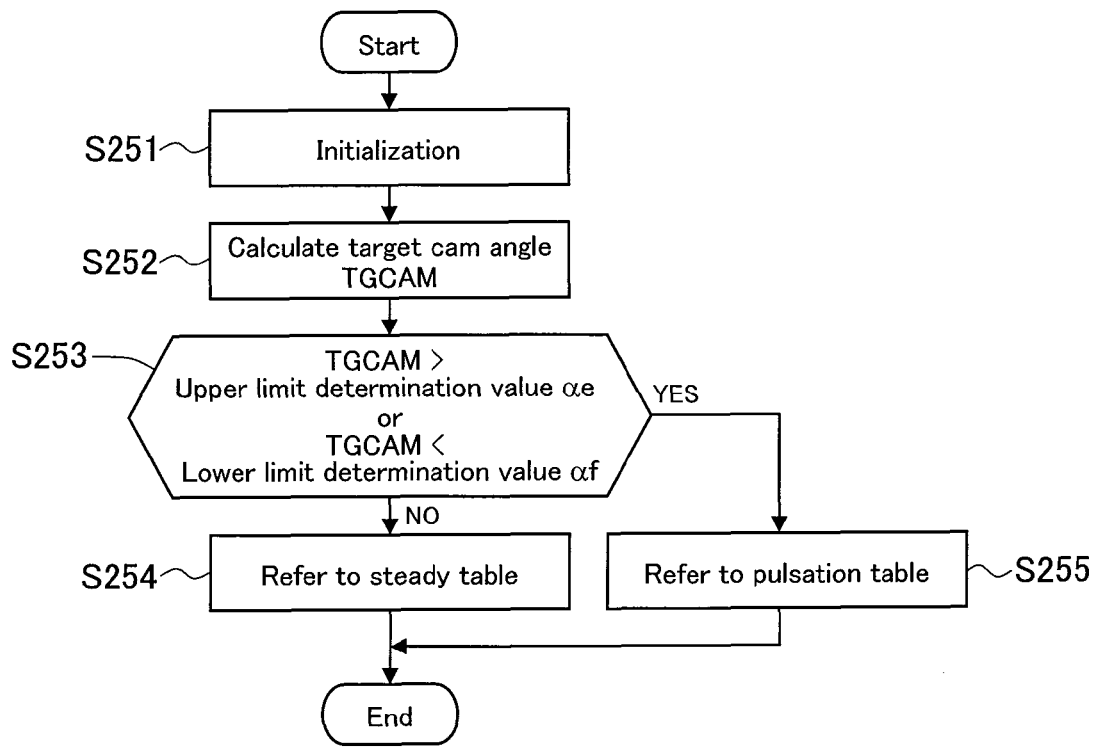
FIG. 12 is a flow chart for describing an air flow rate conversion method according to embodiment 4.

FIG. 12 is a flow chart for describing an air flow rate conversion method according to the present embodiment. FIG. 13 is a view for describing a relationship between the intake valve closing timing of the valve timing variable mechanism and the pulsation amplitude ratio.

There is a case where blow back from the combustion chamber 67a to the intake passage 64 is caused due to a change in the valve timing of the valve timing variable mechanism 91. The blow back is caused at the time when the intake valve closing timing is early or late. When the intake valve closing timing is early, the blow back is caused because the overlapping of the intake valve 92 is large and the intake valve 92 is opened before the exhaust process is completed.

When the intake valve closing timing is late, the air in the cylinder is blown back to the side of the intake passage 64 during a compression stroke because of the delayed closing of the intake valve. Therefore, for example, as shown in FIG. 13, in the case where the closing timing of the intake valve is early and late, large pulsation is caused (pulsation amplitude ratio is increased).

First, in step S251, initialization processing is performed. In step S252, a target cam angle TGCAM, which is a control amount of the valve timing variable mechanism 91, is calculated. The target cam angle TGCAM is calculated according to the operating condition of the internal combustion engine 65.

Then, in step S253, it is determined whether or not the target cam angle TGCAM is larger than a predetermined upper limit determination value αe or whether or not the target cam angle TGCAM is smaller than a predetermined lower limit determination value αf. Then, when the target cam angle TGCAM is larger than the upper limit determination value αe or when the target cam angle TGCAM is smaller than the lower limit determination value αf (YES in step S253), it is determined that large pulsation causing an error in the air flow rate measurement is generated. Then, in step S255, processing to convert a signal from the air flow sensor 2 into an air flow rate is performed by referring to the pulsation table T2.

On the other hand, when the target cam angle TGCAM is equal to or larger than the lower limit determination value αf and is equal to or smaller that the upper limit determination value αe (NO in step S253), it is determined that large pulsation causing an error in the air flow rate measurement is not generated. Then, in step S254, processing to convert a signal from the air flow sensor 2 into an air flow rate is performed by referring to the steady table T1. The upper limit determination value αe and the lower limit determination value αf are respectively set to values immediately before the pulsation amplitude ratio is rapidly increased in FIG. 13.

Therefore, it is possible to obtain an accurate air flow rate in which the air flow rate measurement error caused by the air flow sensor 2 at the time of occurrence of pulsation is corrected.

Note that in embodiment 4 described above, the case of the valve timing variable mechanism 91 capable of changing the operation angle is described as an example of the variable valve mechanism, but the present invention can also be applied to the case of a valve lift amount variable mechanism capable of changing the valve lift amount. In the case of the valve lift amount variable mechanism, as the valve lift amount is increased, pulsation is also increased. Thus, it may be configured such that when the valve lift amount is compared with a predetermined determination value, and when the valve lift amount is larger than the determination value, the pulsation table T2 is referred to by determining that large pulsation causing an error in the air flow rate measurement is generated.

Embodiment 5

Figure 14:
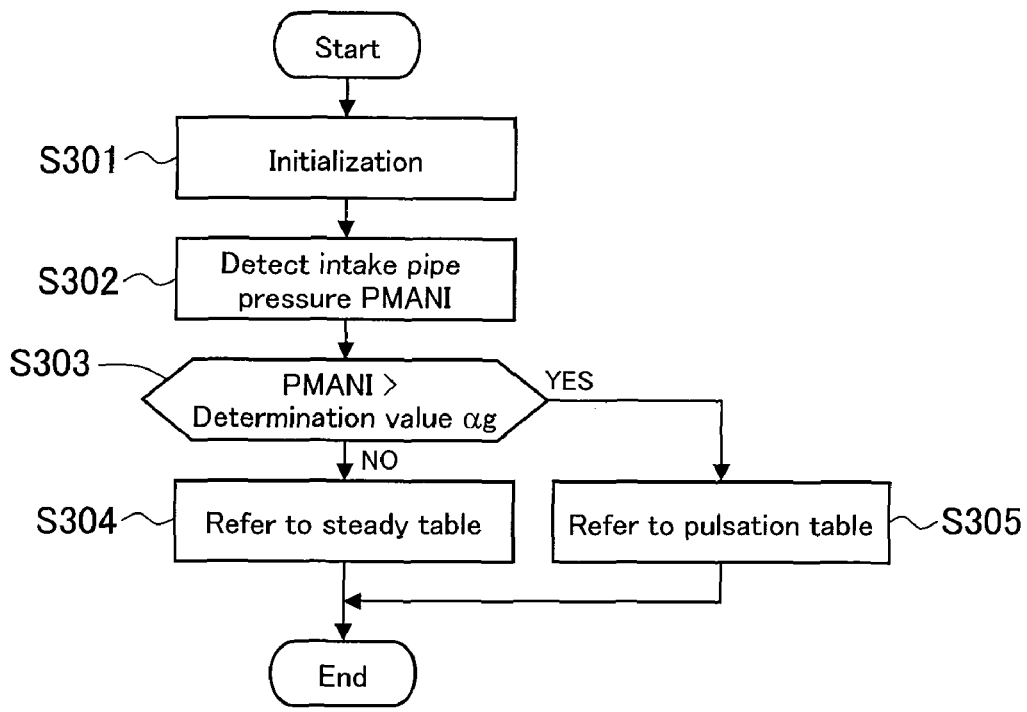
FIG. 14 is a flow chart for describing an air flow rate conversion method according to embodiment 5.
Figure 15:
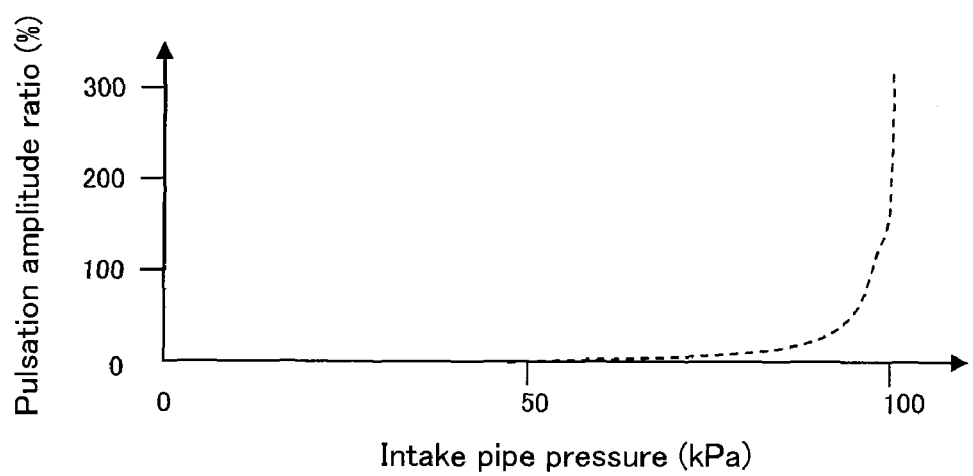
FIG. 15 is a view for describing a relationship between the intake pipe pressure and the pulsation amplitude ratio.

In the present embodiment, a case will be described where the intake pipe pressure is used as a state value which directly or indirectly indicates the sate of pulsation, and where the selection of the conversion tables is performed according to the intake pipe pressure. FIG. 14 is a flow chart for describing an air flow rate conversion method according to embodiment 5. FIG. 15 is a view for describing a relationship between the intake pipe pressure and the pulsation.

As shown in FIG. 15, the pulsation amplitude ratio tends to be increased as the intake pipe pressure in the intake passage 64 is increased. Therefore, the state of pulsation can be recognized according to the intake pipe pressure.

First, in step S301, initialization processing is performed. In step S302, intake pipe pressure PMANI in the intake pipe 63 is detected. Then, in step S303, it is determined whether or not the intake pipe pressure PMANI is larger than a predetermined determination value $\alpha g$ (negative pressure determination value).

When it is determined that the intake pipe pressure PMANI is larger than the determination value $\alpha g$ (YES in step S303), it is determined that large pulsation causing an error in the air flow rate measurement is generated. Then, in step S305, the pulsation table T2 is referred to.

On the other hand, when it is determined that the intake pipe pressure PMANI is equal to or lower than the determination value $\alpha g$ (NO in step S3303), it is determined that large pulsation causing an error in the air flow rate measurement is not generated. Then, in step S304, the steady table T1 is referred to. Therefore, it is possible to obtain an accurate air flow rate in which the air flow rate measurement error caused by the air flow sensor 2 at the time of occurrence of pulsation is corrected.

Embodiment 6

The present embodiment is featured in that two conversion tables are selected as conversion tables used for the conversion, in that a signal from the air flow sensor 2 is used to refer to the two conversion tables, and in that processing to obtain an air flow rate is performed by interpolation calculation.

Figure 16:
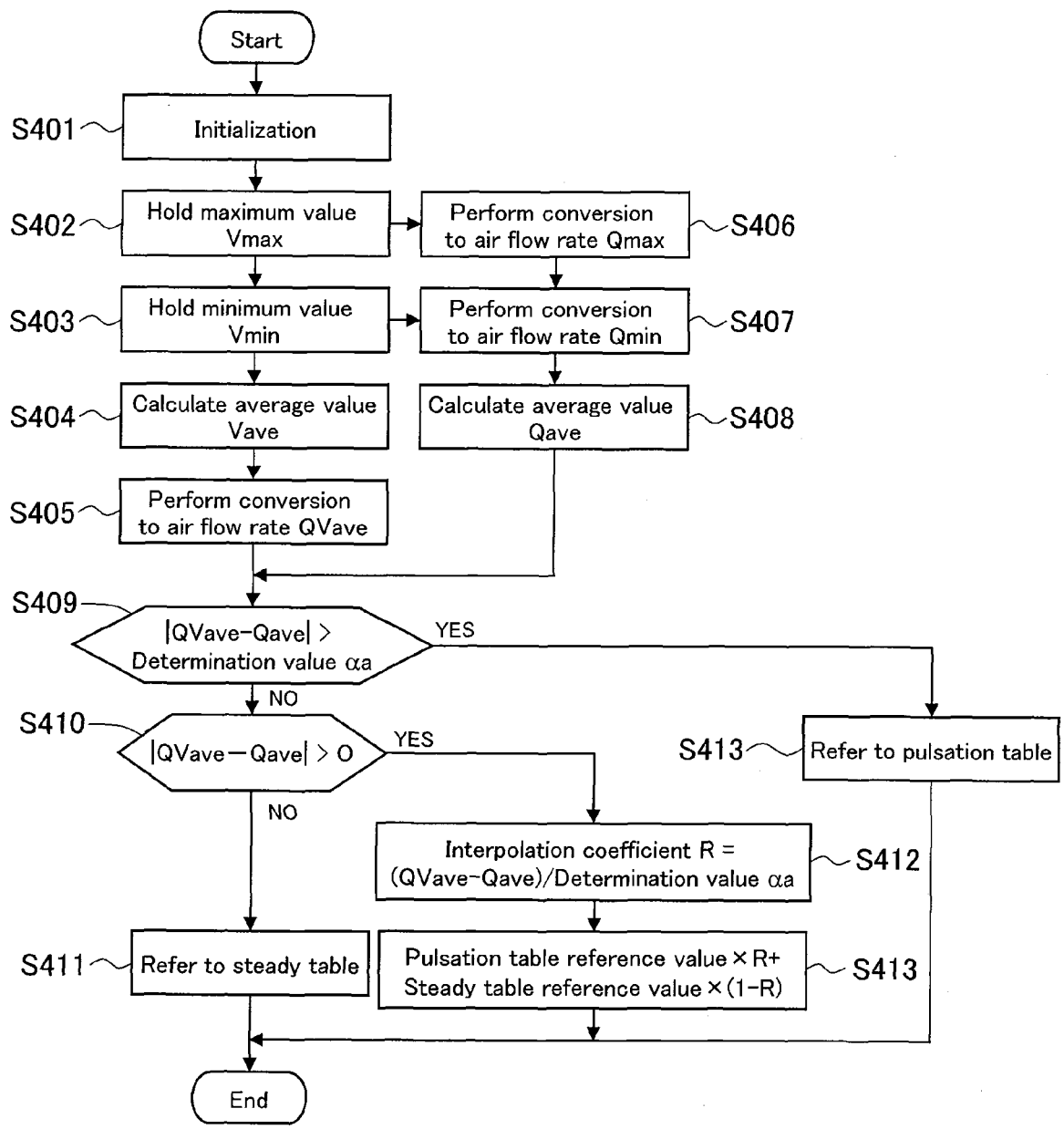
FIG. 16 is a flow chart for describing an air flow rate conversion method according to embodiment 6.

FIG. 16 is a flow chart for describing an air flow rate conversion method according to embodiment 6. In the flow chart shown in FIG. 16, since step S401 to step S408 are the same as step S101 to step S108 in embodiment 1, the detailed description thereof is omitted, and step S409 and steps subsequent to step S409, which are different from the steps in embodiment 1, are described.

In step S409, it is determined whether or not the absolute value of the difference between the average air flow rate conversion value QVave calculated in step S405 and the average air flow rate calculation value Qave calculated in step S408 is larger than a predetermined determination value $\alpha a$.

When the absolute value of the difference is larger than the determination value $\alpha a$ (YES in step S409), then in step S413, processing to convert a signal from the air flow sensor 2 into an air flow rate is performed by referring to the pulsation table T2. On the other hand, the absolute value of the difference is equal to or less than the determination value $\alpha a$ (NO in step S409), the process shifts to step S410, and it is determined whether or not the absolute value of the difference is larger than zero. When the absolute value of the difference is zero or less (NO in step S410), the process shifts to step S411, and processing to convert a signal from the air flow sensor 2 into an air flow rate is performed by referring to the steady table T1.

Further, when the absolute value of the difference is larger than zero (YES in step S410), the process shifts to step S412, and processing to calculate an interpolation coefficient R is performed. The interpolation coefficient R can be obtained by the following expression (1).

$$R = (QVave - Qave)/\alpha a \quad (1)$$

Then, the process shifts to step S413, and the interpolation calculation is performed. The interpolation calculation is performed by using the following expression (2).

$$\text{Air flow rate} = (\text{pulsation table reference value}) \times R + (\text{steady table reference value}) \times (1-R) \quad (2)$$

As shown in expression (2) described above, the air flow rate can be calculated in such a manner that a signal from the air flow sensor 2 is used to refer to the pulsation table T2 and the steady table T1, and that a value obtained by multiplying a reference value obtained by referring to the pulsation table T2 by the interpolation coefficient R is added to a value obtained by multiplying a reference value obtained by referring to the steady table T1 by (1−the interpolation coefficient R). According to the above described air flow rate conversion method, it is possible to prevent that the value of the air flow rate is rapidly changed at the time when the conversion tables are switched according to the state of pulsation.

Embodiment 7

The present embodiment is featured by a configuration in which instead of the interpolation calculation in embodiment 6, the distribution ratio of the two conversion tables is continuously changed according to the minimum air flow rate at the time of pulsation.

Figure 17:
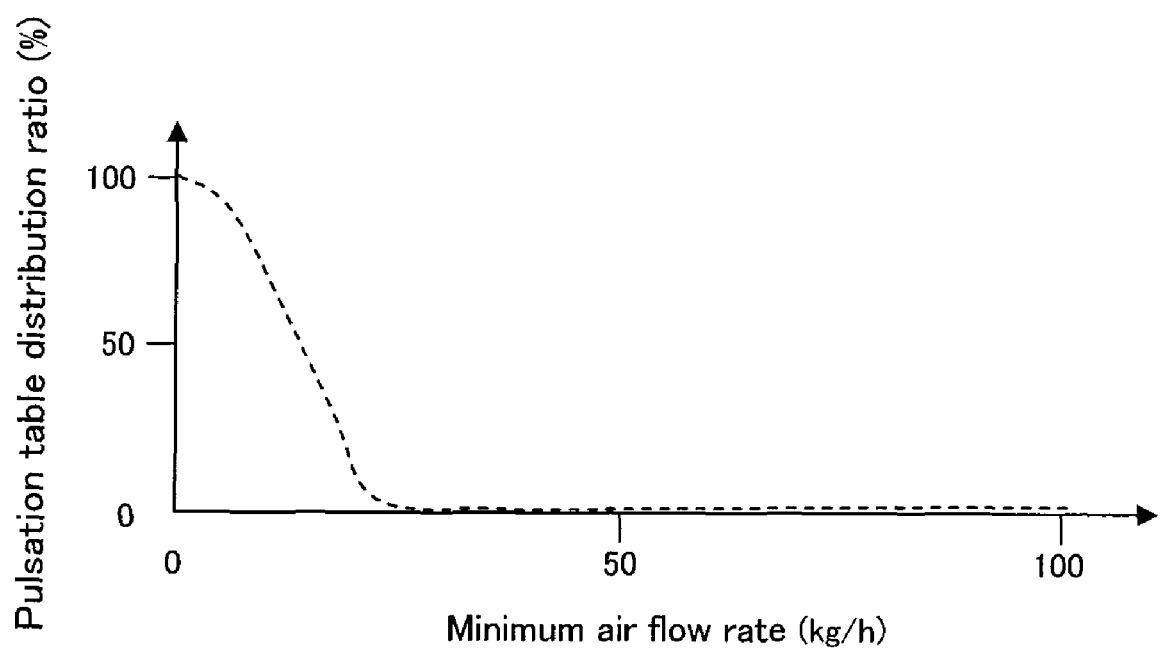
FIG. 17 is a view showing a relationship between the target minimum air flow rate and the distribution ratio of a plurality of tables in embodiment 7.

FIG. 17 is a view showing a relationship between the minimum air flow rate and the distribution ratio of a plurality of tables, and shows an example in which the distribution ratio of the two conversion tables of the steady table T1 and the pulsation table T2 is continuously changed according to the minimum air flow rate at the time of pulsation.

As the minimum air flow rate, for example, the minimum air flow rate conversion value Qmin, which is obtained in step S407 of FIG. 16, is used. As shown in FIG. 17, the distribution ratio is set in such a manner that the ratio of the pulsation table T2 is increased as the minimum air flow rate is reduced, and that the ratio of the pulsation table T2 becomes 100% in the case where the minimum air flow rate is zero or less.

In the present embodiment, instead of the interpolation calculation in steps S412 and S413 of FIG. 16, conversion processing to obtain an air flow rate is performed on the basis of the distribution ratio of the two conversion tables of the steady table T1 and the pulsation table T2. According to this method, it is possible to prevent that the value of the air flow rate is rapidly changed at the time when the conversion tables are switched according to the state of pulsation.

Note that the configuration according to the present invention is not limited to each of the above described embodiments, and various combinations are possible within the scope and spirit of the invention. For example, two kinds of conversion tables of the pulsation table and the steady table are used in each of embodiment 1 to embodiment 7 as described above. However, the number of conversion tables may be increased to three or more so that more precise control can be performed. Further, the present invention is applied to a four-cycle engine, and can be applied not only to a gasoline engine but also to a diesel engine.

What is claimed is:

1. An internal combustion engine control apparatus, having a thermal air flow rate measuring apparatus which measures the flow rate of air flowing through an intake passage on the basis of a signal from a heating resistor, comprising:
    storage means for storing a plurality of conversion tables used to convert a signal of the heating resistor to an air flow rate;
    selection means for selecting a conversion table to be used for the conversion from the plurality of conversion tables stored in the storage means; and
    conversion means for converting a signal of the heating resistor into an air flow rate by referring to the conversion table selected by the selection means;
    wherein the selection means performs selection of the conversion table according to a state value which directly or indirectly indicates the state of air flow pulsation generated in the passage; and
    wherein among the forward air flow rate and the reverse air flow rate, the steady table is set to be used only for the conversion of the forward air flow rate.

2. The internal combustion engine control apparatus according to claim 1, wherein the selection means calculates an average air flow rate conversion value by converting, into an air flow rate, an average value obtained from maximum and minimum values of the signal of the heating resistor, and calculates an average air flow rate calculation value, as an average value, from a maximum air flow rate conversion value obtained by converting the maximum value of the signal into an air flow rate and a minimum air flow rate conversion value obtained by converting the minimum value of the signal into an air flow rate, and wherein the selection means performs selection of the conversion table according to the difference between the average air flow rate conversion value and the average air flow rate calculation value.

3. The internal combustion engine control apparatus according to claim 2, wherein a pulsation table and a steady table are stored beforehand as the conversion tables in the storage means, and wherein the selection means selects the pulsation table at the time when the difference is larger than a predetermined determination value, and selects the steady table at the time when the difference is equal to or less than the determination value.

* * * * *